US012356203B2

(12) United States Patent
Ahmad et al.

(10) Patent No.: US 12,356,203 B2
(45) Date of Patent: Jul. 8, 2025

(54) DYNAMIC NETWORK RESOURCE MANAGEMENT IN A WIRELESS COMMUNICATIONS SYSTEM (WCS)

(71) Applicant: Corning Research & Development Corporation, Corning, NY (US)

(72) Inventors: Syed Noman Ahmad, San Jose, CA (US); Kalle Ahmavaara, Los Angeles, CA (US); Risto Karkkainen, Espoo (FI); Shirish Nagaraj, Pleasanton, CA (US); Deepak Pengoria, Milpitas, CA (US)

(73) Assignee: ANI Acquisition Sub, LLC, Boca Raton, FL (US)

( * ) Notice: Subject to any disclaimer, the term of this patent is extended or adjusted under 35 U.S.C. 154(b) by 465 days.

(21) Appl. No.: 17/824,797

(22) Filed: May 25, 2022

(65) Prior Publication Data

US 2022/0386133 A1 Dec. 1, 2022

Related U.S. Application Data

(60) Provisional application No. 63/192,951, filed on May 25, 2021.

(51) Int. Cl.
*H04W 16/14* (2009.01)
*H04B 7/155* (2006.01)
(Continued)

(52) U.S. Cl.
CPC ........ *H04W 16/14* (2013.01); *H04B 7/15507* (2013.01); *H04W 16/18* (2013.01);
(Continued)

(58) Field of Classification Search
CPC ..... H04W 16/14; H04W 16/18; H04W 84/04; H04W 88/16; H04W 92/20; H04W 76/10;
(Continued)

(56) References Cited

U.S. PATENT DOCUMENTS

| 8,570,224 | B2 * | 10/2013 | Mattis | H01Q 1/02 |
| | | | | 343/702 |
| 8,995,933 | B2 | 3/2015 | Waldvogel et al. | |
| 9,918,267 | B2 * | 3/2018 | Plestid | H04W 36/24 |
| 10,110,308 | B2 * | 10/2018 | Harel | H04J 14/0204 |
| 10,470,074 | B2 * | 11/2019 | Kashyap | H04W 28/0861 |

(Continued)

FOREIGN PATENT DOCUMENTS

| EP | 4117214 A1 * | 1/2023 | ........ H04L 1/1812 |
| WO | WO-2021115234 A1 * | 6/2021 | ........ H04B 10/2575 |

*Primary Examiner* — Ayaz R Sheikh
*Assistant Examiner* — Louis Samara
(74) *Attorney, Agent, or Firm* — Greenberg Traurig, LLP; Mammen ("Roy") Zachariah

(57) ABSTRACT

Dynamic network resource management in a wireless communications system (WCS) is disclosed. The WCS includes multiple radio access network (RAN) remote units each configured to communicate a radio frequency (RF) signal(s) in a respective one of multiple coverage cells. The multiple coverage cells can be associated with a number of cell groups, with each of the cell groups including one or more of the multiple coverage cells. Given that all of the cell groups are operating based on a set of network functions configured for the WCS, the WCS further employs a network device to dynamically determine a set of sharable network functions and share the set of sharable network functions among the cell groups. By dynamically sharing the sharable network functions across the cell groups, it is possible to maximize throughput in each of the cell groups based on the set of sharable network functions.

17 Claims, 10 Drawing Sheets

(51) Int. Cl.
*H04W 16/18* (2009.01)
*H04W 84/04* (2009.01)
*H04W 88/16* (2009.01)
*H04W 92/20* (2009.01)

(52) U.S. Cl.
CPC ............ *H04W 84/04* (2013.01); *H04W 88/16* (2013.01); *H04W 92/20* (2013.01)

(58) Field of Classification Search
CPC ... H04B 7/15507; H04L 1/1854; H04L 69/22; H04L 27/2605; H04L 12/1845; H04L 47/70
See application file for complete search history.

(56) References Cited

U.S. PATENT DOCUMENTS

| | | | |
|---|---|---|---|
| 11,337,260 B2* | 5/2022 | Youtz | H04W 76/10 |
| 2012/0236774 A1* | 9/2012 | Guey | H04W 28/16 |
| | | | 370/312 |
| 2017/0272226 A1* | 9/2017 | Seo | H04L 5/0053 |
| 2018/0132264 A1* | 5/2018 | Jung | H04W 72/20 |
| 2018/0139107 A1* | 5/2018 | Senarath | H04L 47/70 |
| 2019/0042326 A1* | 2/2019 | Chilikin | G06F 9/45558 |
| 2019/0200285 A1* | 6/2019 | Velev | H04W 16/02 |
| 2020/0084649 A1* | 3/2020 | Harel | H04B 17/336 |
| 2021/0006944 A1* | 1/2021 | Raghothaman | H04L 12/1845 |
| 2022/0052891 A1* | 2/2022 | Kulik | H04L 27/2605 |

* cited by examiner

500

DETERMINE A SET OF SHARABLE NETWORK FUNCTIONS AMONG A SET OF CONFIGURED NETWORK FUNCTIONS
502

DYNAMICALLY SHARE THE SET OF SHARABLE NETWORK FUNCTIONS ACROSS AT LEAST A SUBSET OF A PLURALITY OF CELL GROUPS (416(1)-416(N)) EACH COMPRISING ONE OR MORE OF A PLURALITY OF COVERAGE CELLS (414)
504

DYNAMIC NETWORK RESOURCE MANAGEMENT IN A WIRELESS COMMUNICATIONS SYSTEM (WCS)

CROSS-REFERENCE TO RELATED APPLICATIONS

This application claims the benefit of priority under 35 U.S.C. § 119 of U.S. Provisional Application Ser. No. 63/192,951, filed May 25, 2021, the content of which is relied upon and incorporated herein by reference in its entirety.

BACKGROUND

The disclosure relates generally to network resource management in a wireless communications system (WCS), such as a fifth generation (5G) or a 5G new-radio (5G-NR) system and/or a distributed communications system (DCS).

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming RF antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a WCS 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (eNodeB) that includes modem functionality and is configured to distribute communications signal streams 108(1)-108(S) to the wireless client devices 106(1)-106(W) based on communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the WCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on respective communications signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous signal beams ("beams") 120(1)-120(N) for the communications signal streams 108(1)-108(S) to serve multiple wireless client devices 106(1)-106(W). For example, the multiple beams 120(1)-120(N) may support multiple-input, multiple-output (MIMO) communications.

The radio node 102 of the WCS 100 in FIG. 1 may be configured to support service providers 104(1)-104(N) that have a different frequency spectrum and do not share the spectrum. Thus, in this instance, the communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e., shared) between the multiple service providers 104(1)-104(N) for providing services to the subscribers.

The radio node 102 in FIG. 1 can also be coupled to a distributed communications system (DCS), such as a distributed antenna system (DAS), such that the radio circuits 118(1)-118(N) remotely distribute the communications signals 110(1)-110(N) of the multiple service providers 104(1)-104(N) to remote units. The remote units can each include an antenna array that includes tens or even hundreds of antennas for concurrently radiating the communications signals 110(1)-110(N) to subscribers using spatial multiplexing. Herein, the spatial multiplexing is a scheme that takes advantage of the differences in RF channels between transmitting and receiving antennas to provide multiple independent streams between the transmitting and receiving antennas, thus increasing throughput by sending data over parallel streams. Accordingly, the remote units can be said to radiate the communications signals 110(1)-110(N) to subscribers based on a massive multiple-input multiple-output (M-MIMO) scheme.

The WCS 100 may be configured to operate as a fifth generation (5G) or a 5G new-radio (5G-NR) communications system. In this regard, the radio node 102 can function as a 5G or 5G-NR base station (a.k.a. eNodeB) to service the wireless client devices 106(1)-106(W) in a primary coverage cell (a.k.a. PCell). The radio node 102 can be configured with a specific total amount of capacity that may depend on, for example, bandwidth for the primary coverage cell, the M-MIMO scheme, and utilized signal modulation. Sometimes, the mobile devices may communicate the communications signals 110(1)-110(N) via carrier aggregation by connecting simultaneously to some other radio nodes in secondary coverage cells (a.k.a. SCells) in addition to the radio node 102 in the primary coverage cell. Hereinafter, the PCell and the SCells that are configured to concurrently communicate the communications signals 110(1)-110(N) based on carrier aggregation are said to be members of a cell group.

To communicate effectively with the wireless client devices 106(1)-106(W) in both the PCell and the SCells, it may be necessary for the cell group to carry out a set of network functions, which may include, user scheduling, individual channel processing, logical layer (L2) protocol instances, physical layer (L1) protocol instances, and so on. Understandably, each of the network functions may consume certain amount of networking resources (e.g., bandwidth in the PCell and the SCells). Given that there can be multiple cell groups operating concurrently in the WCS 100, the multiple cell groups would each consume a portion of the overall networking resources available in the WCS 100. As such, it is desirable to dynamically manage the available networking resources of the WCS 100 across the multiple cell groups such that the multiple cell groups do not collectively consume more than the available networking resources of the WCS 100.

No admission is made that any reference cited herein constitutes prior art. Applicant expressly reserves the right to challenge the accuracy and pertinency of any cited documents.

SUMMARY

Embodiments disclosed herein include dynamic network resource management in a wireless communications system (WCS). The WCS includes multiple radio access network (RAN) remote units each configured to communicate a radio frequency (RF) signal(s) in a respective one of multiple coverage cells. The multiple coverage cells can be associated with a number of cell groups, with each of the cell groups including one or more of the multiple coverage cells. In a non-limiting example, each of the cell groups supports carrier aggregation based on the coverage cell(s) associated with the cell group. Given that all of the cell groups are operating based on a set of network functions configured for the WCS, the WCS further employs a network device, such as a distribution unit (DU), to dynamically determine a set of sharable network functions and share the set of sharable network functions among the cell groups. By dynamically sharing the sharable network functions across the cell groups, it is possible to maximize throughput in each of the cell groups based on the set of sharable network functions.

One exemplary embodiment of the disclosure relates to a WCS. The WCS includes a plurality of RAN remote units each configured to communicate a downlink communications signal and an uplink communications signal via a respective one of a plurality of cell groups. The WCS also includes a network device coupled to the plurality of RAN remote units. The network device is configured to determine a set of sharable network functions among a set of configured network functions. The network device is also configured to dynamically share the set of sharable network functions across at least a subset of the plurality of cell groups.

An additional exemplary embodiment of the disclosure relates to a method for supporting dynamic network resource management in a WCS. The method includes determining a set of sharable network functions among a set of configured network functions. The method also includes dynamically sharing the set of sharable network functions across at least a subset of a plurality of cell groups each comprising one or more of a plurality of coverage cells.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include dynamic network resource management in a wireless communications system (WCS). The WCS includes multiple radio access network (RAN) remote units each configured to communicate a radio frequency (RF) signal(s) in a respective one of multiple coverage cells. The multiple coverage cells can be associated with a number of cell groups, with each of the cell groups including one or more of the multiple coverage cells. In a non-limiting example, each of the cell groups supports carrier aggregation based on the coverage cell(s) associated with the cell group. Given that all of the cell groups are operating based on a set of network functions configured for the WCS, the WCS further employs a network device, such as a distribution unit (DU), to dynamically determine a set of sharable network functions and share the set of sharable network functions among the cell groups. By dynamically sharing the sharable network functions across the cell groups, it is possible to maximize throughput in each of the cell groups based on the set of sharable network functions.

Figure 1:
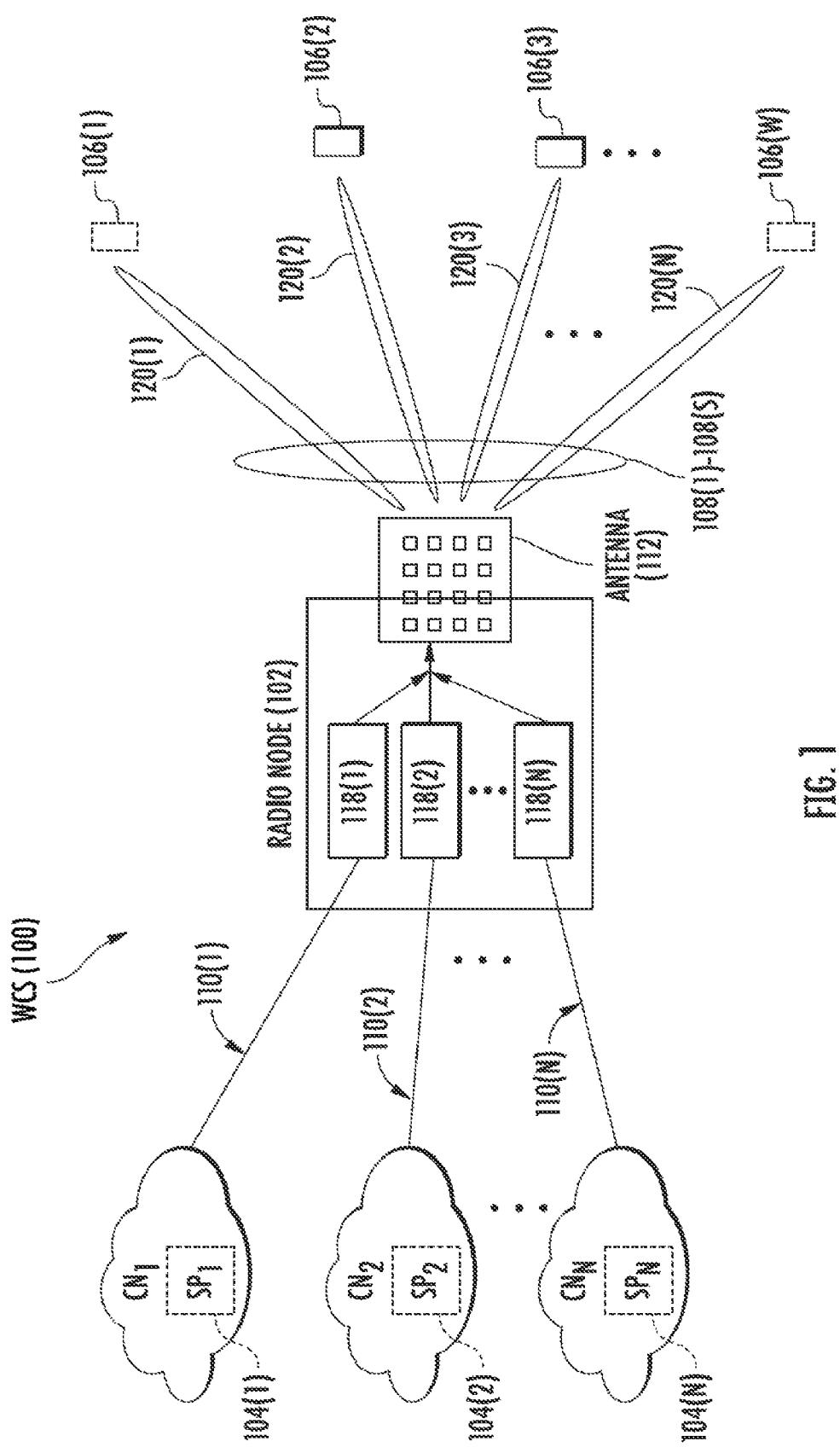
FIG. 1 is a schematic diagram of an exemplary wireless communications system (WCS), such as a distributed communications system (DCS), configured to distribute communications services to remote coverage areas.
Figure 2:
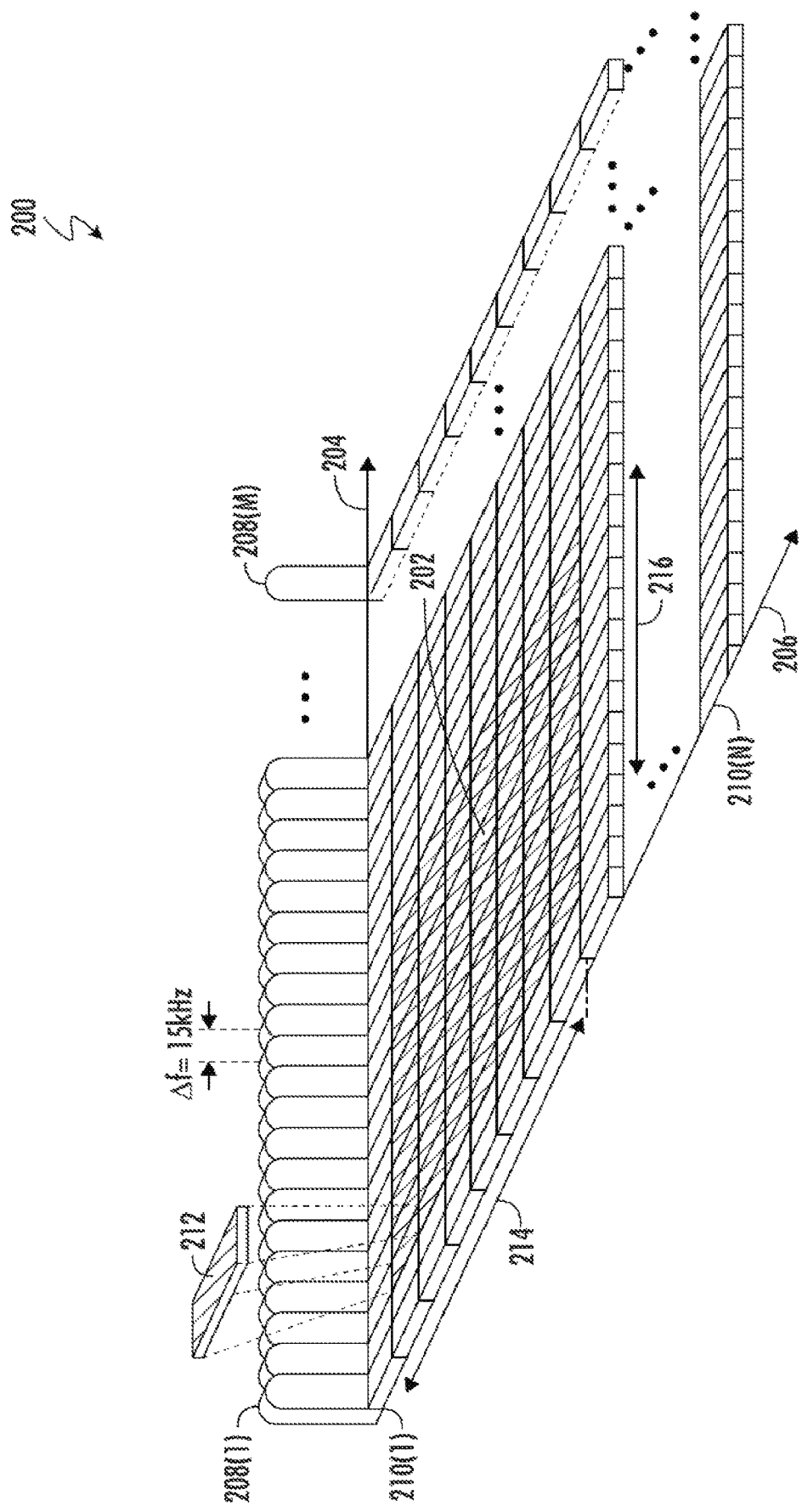
FIG. 2 is a schematic diagram of an exemplary physical resource allocation scheme based on an orthogonal frequency division multiplexing (OFDM) time-frequency grid that includes at least one physical resource block (PRB)
Figure 3:
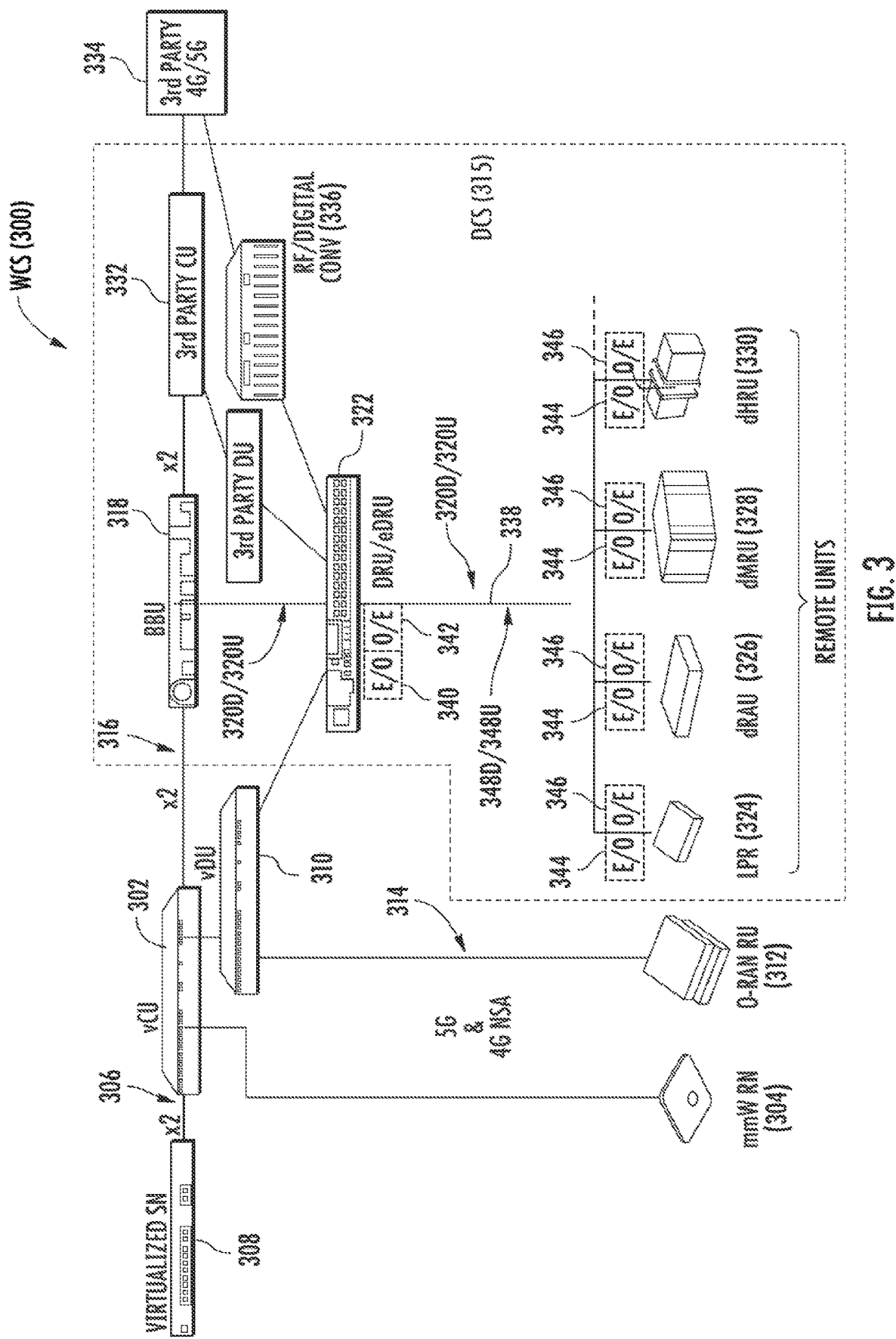
FIG. 3 is a schematic diagram of an exemplary WCS configured according to any of the embodiments disclosed herein to enable dynamic network resource management.

Before discussing supporting intelligent thermal and power management in a WCS according to the present disclosure, starting at FIG. 3, an overview of physical and logical radio resource allocations in a wireless communications network is first provided with reference to FIG. 2.

In this regard, FIG. 2 is a schematic diagram of an exemplary physical resource allocation scheme based on an orthogonal frequency division multiplexing (OFDM) time-frequency grid 200 that includes at least one physical resource block (PRB) 202. The OFDM time-frequency grid 200 includes a frequency-domain axis 204 and a time-domain axis 206. Along the frequency-domain axis 204, there are a number of subcarriers 208(1)-208(M). The subcarriers 208(1)-208(M) are orthogonally separated from each other by a frequency spacing $\Delta f$ (e.g., 15 KHz). Along the time-domain axis 206, there are a number of OFDM symbols 210(1)-210(N). Each intersection of the subcarriers 208(1)-208(M) and the OFDM symbols 210(1)-210(N) defines a resource element (RE) 212. The subcarriers 208(1)-208(M) along the frequency-domain axis 204 and the OFDM symbols 210(1)-210(N) along the time-domain axis 206 are collectively referred to as physical radio resources of the wireless communications network.

In one non-limiting example, the PRB 202 includes twelve (12) consecutive subcarriers among the subcarriers 208(1)-208(M), and fourteen (14) consecutive OFDM symbols among the OFDM symbols 210(1)-210(N). In this regard, the PRB 202 includes one hundred sixty-eight (168) of the REs 212 (12 subcarriers×14 OFDM symbols). The PRB 202 has a PRB duration 214, which equals one-half of a millisecond (0.5 ms), along the time-domain axis 206. The PRB duration 214 is commonly referred to as a slot or a time slot. Accordingly, the subcarriers 208(1)-208(M) collectively define a bandwidth 216, which equals 180 KHz (15 KHz/subcarrier×12 subcarriers) in this example, along the frequency-domain axis 204. In this regard, it is possible to increase or decrease the bandwidth 216 by adding or reducing the subcarriers 208(1)-208(M).

In OFDM-based communication systems like fifth-generation new radio (5G-NR), the PRB 202 is the minimum unit for allocating the physical radio resource to physical data channels, such as physical downlink shared channel (PDSCH) and physical uplink shared channel (PUSCH), and physical control channels, such as physical downlink control channel (PDCCH) and physical uplink control channel (PUCCH). In this regard, the bandwidth 216 directly determines the number of available PRB 202 and, therefore, the maximum capacity of a 5G-NR communication system. Accordingly, it is desirable to effectively share the available PRB 202 to achieve highest possible performance under the maximum capacity of the 5G-NR communication system.

In this regard, FIG. 3 is a schematic diagram of an exemplary WCS 300 configured according to any of the embodiments disclosed herein to support dynamic network resource management. The WCS 300 supports both legacy 4G LTE, 4G/5G non-standalone (NSA), and 5G standalone communications systems. As shown in FIG. 3, a centralized services node 302 is provided that is configured to interface with a core network to exchange communications data and distribute the communications data as radio signals to remote units. In this example, the centralized services node 302 is configured to support distributed communications services to an mmWave radio node 304. Despite that only one of the mmWave radio node 304 is shown in FIG. 3, it should be appreciated that the WCS 300 can be configured to include additional number of the mmWave radio node 304, as needed. The functions of the centralized services node 302 can be virtualized through an x2 interface 306 to another services node 308. The centralized services node 302 can also include one or more internal radio nodes that are configured to be interfaced with a distribution unit (DU) 310 to distribute communications signals to one or more open radio access network (O-RAN) remote units (RUs) 312 that are configured to be communicatively coupled through an O-RAN interface 314. The O-RAN RUs 312 are each configured to communicate downlink and uplink communications signals in a respective coverage cell.

The centralized services node 302 can also be interfaced with a distributed communications system (DCS) 315 through an x2 interface 316. Specifically, the centralized services node 302 can be interfaced with a digital baseband unit (BBU) 318 that can provide a digital signal source to the centralized services node 302. The digital BBU 318 may be configured to provide a signal source to the centralized services node 302 to provide downlink communications signals 320D to a digital routing unit (DRU) 322 as part of a digital distributed antenna system (DAS). The DRU 322 is configured to split and distribute the downlink communications signals 320D to different types of remote units, including a low-power remote unit (LPR) 324, a radio antenna unit (dRAU) 326, a mid-power remote unit (dMRU) 328, and a high-power remote unit (dHRU) 330. The DRU 322 is also configured to combine uplink communications signals 320U received from the LPR 324, the dRAU 326, the dMRU 328, and the dHRU 330 and provide the combined uplink communications signals to the digital BBU 318. The digital BBU 318 is also configured to interface with a third-party central unit 332 and/or an analog source 334 through a radio frequency (RF)/digital converter 336.

The DRU 322 may be coupled to the LPR 324, the dRAU 326, the dMRU 328, and the dHRU 330 via an optical fiber-based communications medium 338. In this regard, the DRU 322 can include a respective electrical-to-optical (E/O) converter 340 and a respective optical-to-electrical (O/E) converter 342. Likewise, each of the LPR 324, the dRAU 326, the dMRU 328, and the dHRU 330 can include a respective E/O converter 344 and a respective O/E converter 346.

The E/O converter 340 at the DRU 322 is configured to convert the downlink communications signals 320D into downlink optical communications signals 348D for distribution to the LPR 324, the dRAU 326, the dMRU 328, and the dHRU 330 via the optical fiber-based communications medium 338. The O/E converter 346 at each of the LPR 324, the dRAU 326, the dMRU 328, and the dHRU 330 is configured to convert the downlink optical communications signals 348D back to the downlink communications signals 320D. The E/O converter 344 at each of the LPR 324, the dRAU 326, the dMRU 328, and the dHRU 330 is configured to convert the uplink communications signals 320U into uplink optical communications signals 348U. The O/E converter 342 at the DRU 322 is configured to convert the uplink optical communications signals 348U back to the uplink communications signals 320U.

The DU 310 is allocated with a set configured network functions that ultimately defines processing and/or networking capabilities of the DU 310 as well as the O-RAN RUs 312. In a non-limiting example, the set of configured network functions includes a plurality of the PRBs, such as the PRB 202 in FIG. 2, that defines a maximum capacity of the DU 310. The set of configured network function may further include such hardware and/or software capabilities (e.g., processor, memory, interface, communication bus, etc.) required for user scheduling, channel processing, logical layer (e.g., medium access control (MAC) or L2) and physical layer (e.g., PHY or L1) protocol processing, interfacing, and so on. As discussed in detail below, the DU 310 may be configured to dynamically manage the set of configured network functions across the O-RAN RUs 312 such that the set of configured network functions can be sufficient to enable each of the O-RAN RUs 312 to provide a maximum throughput in the respective coverage cell.

Figure 4:
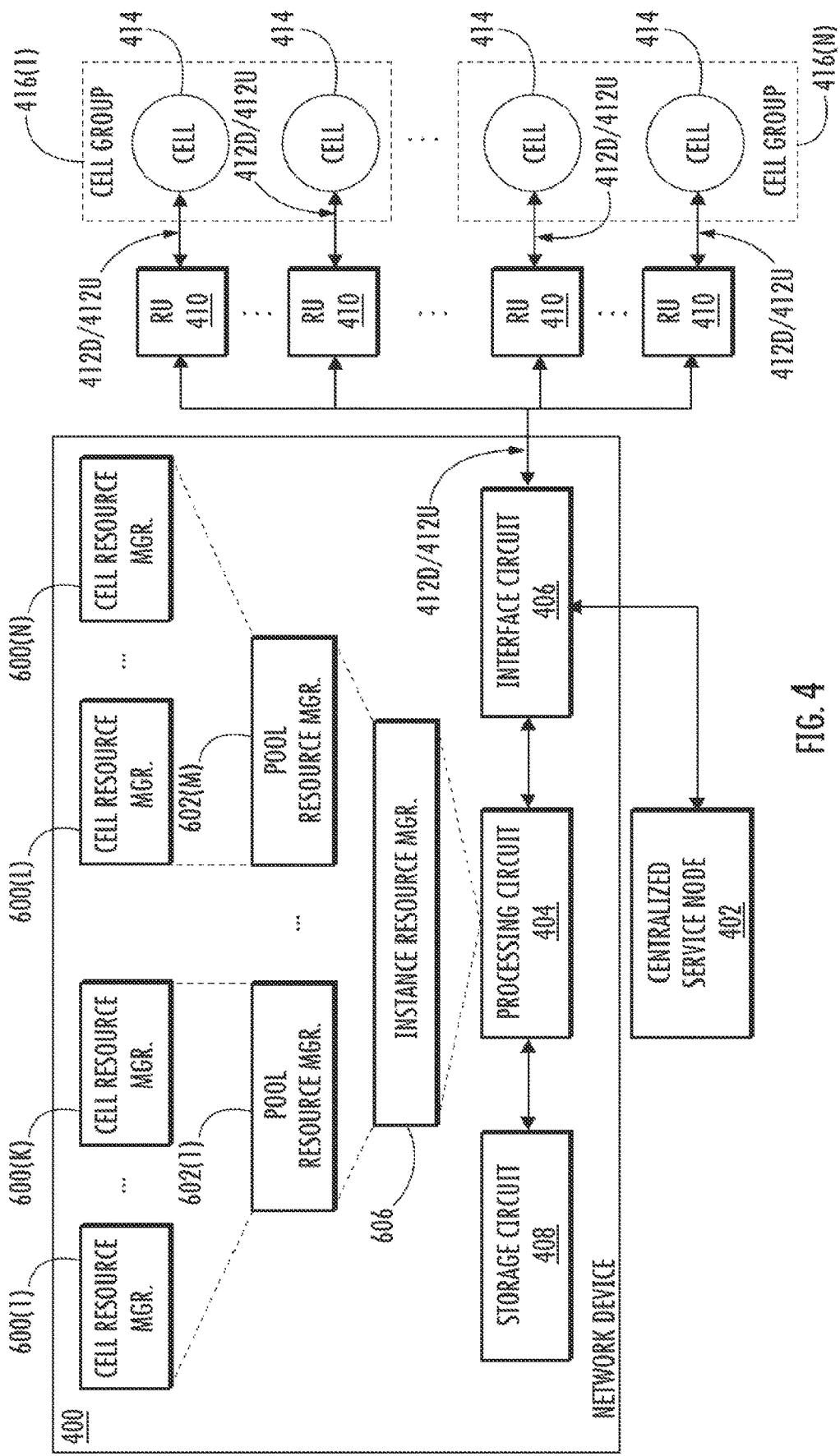
FIG. 4 is a schematic diagram of an exemplary network device configured to enable dynamic network resource management in the WCS of FIG. 3 according to embodiments disclosed in the present disclosure.

FIG. 4 is a schematic diagram of an exemplary network device 400 configured to enable dynamic network resource management in the WCS 300 of FIG. 3 according to embodiments disclosed in the present disclosure. In a non-limiting example, the network device 400 is identical or functionally equivalent to the DU 310 in the WCS 300. In this regard, the network device 400 can be coupled to a centralized service node 402 (e.g., the centralized services node 302 in FIG. 3) and configured to dynamically manage a set of configured network functions in accordance with the embodiments disclosed herein.

In a non-limiting example, the network device 400 includes a processing circuit 404, which can be a field-programmable gate array (FPGA), a central processing unit (CPU), or a general-purpose processor (GPP), as an example. The network device 400 may also include an interface circuit 406, which can include various connectors, converters, and/or communication buses, for example. The network device 400 may further include a storage circuit 408, which can include registers and/or various type of memory circuits, for example. Notably, the network device 400 may further include additional circuits to support additional functionalities.

The interface circuit 406 may be coupled to the centralized service node 402 and a plurality of RAN RUs 410. In a non-limiting example, each of the RAN RUs 410 is identical or functionally equivalent to the O-RAN RUs 312 in FIG. 3. In this regard, the RAN RUs 410 are each configured to communicate a downlink communications signal 412D and an uplink communications signal 412U in a respective one of a plurality of coverage cells 414. The coverage cells 414 may be grouped into a plurality of cell groups 416(1)-416(N), with each of the cell groups 416(1)-416(N) including one or more of the coverage cells 414.

In a non-limiting example, each of the cell groups 416(1)-416(N) is configured to communicate the downlink communications signal 412D and the uplink communications signal 412U based on carrier aggregation. In this regard, in each of the cell groups 416(1)-416(N), some of the coverage cells 414 will serve as a primary cell(s) (PCell(s)) while some other of the coverage cells 414 will serve as a secondary cell(s) (SCell(s)). Notably, the cell groups 416(1)-416(N) may each perform carrier aggregation on a respective set of RF bands that may be identical or different across the cell groups 416(1)-416(N).

The cell groups 416(1)-416(N) may be formed statically or dynamically. In a non-limiting example, the cell groups 416(1)-416(N) may be formed statically based on a cell configuration prestored in the storage circuit 408 and adjusted dynamically thereafter. The storage circuit 408 may also store resource information related to the set of configured network functions available to the network device 400, including but not limited to a maximum system bandwidth (e.g., the bandwidth 216 in FIG. 2) and a maximum number of PRBs (e.g., the PRB 202 in FIG. 2) available in each time unit (e.g., the OFDM symbols 210(1)-210(N) in FIG. 2). As mentioned earlier, the set of configured network functions may also include hardware and/or software capabilities required for user scheduling, channel processing, logical layer (e.g., MAC or L2) and physical layer (e.g., PHY or L1) protocol processing, interfacing, and so on.

The processing circuit 404 may be configured to determine a set of sharable network functions and a set of non-sharable network functions among the set of configured network functions. In a non-limiting example, the set of sharable network functions includes a subset of the maximum number of PRBs configured to be allocated to such data channels as PDSCH and PUSCH, and the set of non-sharable network functions includes another subset of the maximum number of PRBs configured to be allocated to such control channels as PDCCH and PUCCH. The processing circuit 404 may determine the set of sharable network functions and the set of non-sharable network functions based on such configurations as defined by corresponding 3GPP standards.

The processing circuit 404 is configured to dynamically share the set of sharable network functions across at least a subset of the cell groups 416(1)-416(N), but not to share the set of non-sharable network functions with any of the cell groups 416(1)-416(N). In this regard, each of the RAN RUs 410 retains full control over PDCCH and PUCCH in the respective one of the coverage cells 414. By dynamically sharing the set of sharable network functions among the cell groups 416(1)-416(N), each of the RAN RUs 410 can provide a maximum throughput in the respective one of the coverage cells 414 without exceeding physical resource limitation (e.g., the maximum system bandwidth) of the network device 400.

Figure 5:
FIG. 5 is a flowchart of an exemplary process that may be employed by the network device of FIG. 4 to support dynamic network resource management.

The network device 400 may be configured to support dynamic network resource management based on a process. In this regard, FIG. 5 is a flowchart of an exemplary process 500 that may be employed by the network device 400 of FIG. 4 to support dynamic network resource management.

According to the process 500, the network device 400 is configured to determine the set of sharable network functions among the set of configured network functions (block 502). Accordingly, the network device 400 dynamically shares the set of sharable network functions across at least a subset of the cell groups 416(1)-416(N), wherein each of the cell groups 416(1)-416(N) includes one or more of the coverage cells 414 (block 504).

Figure 6:
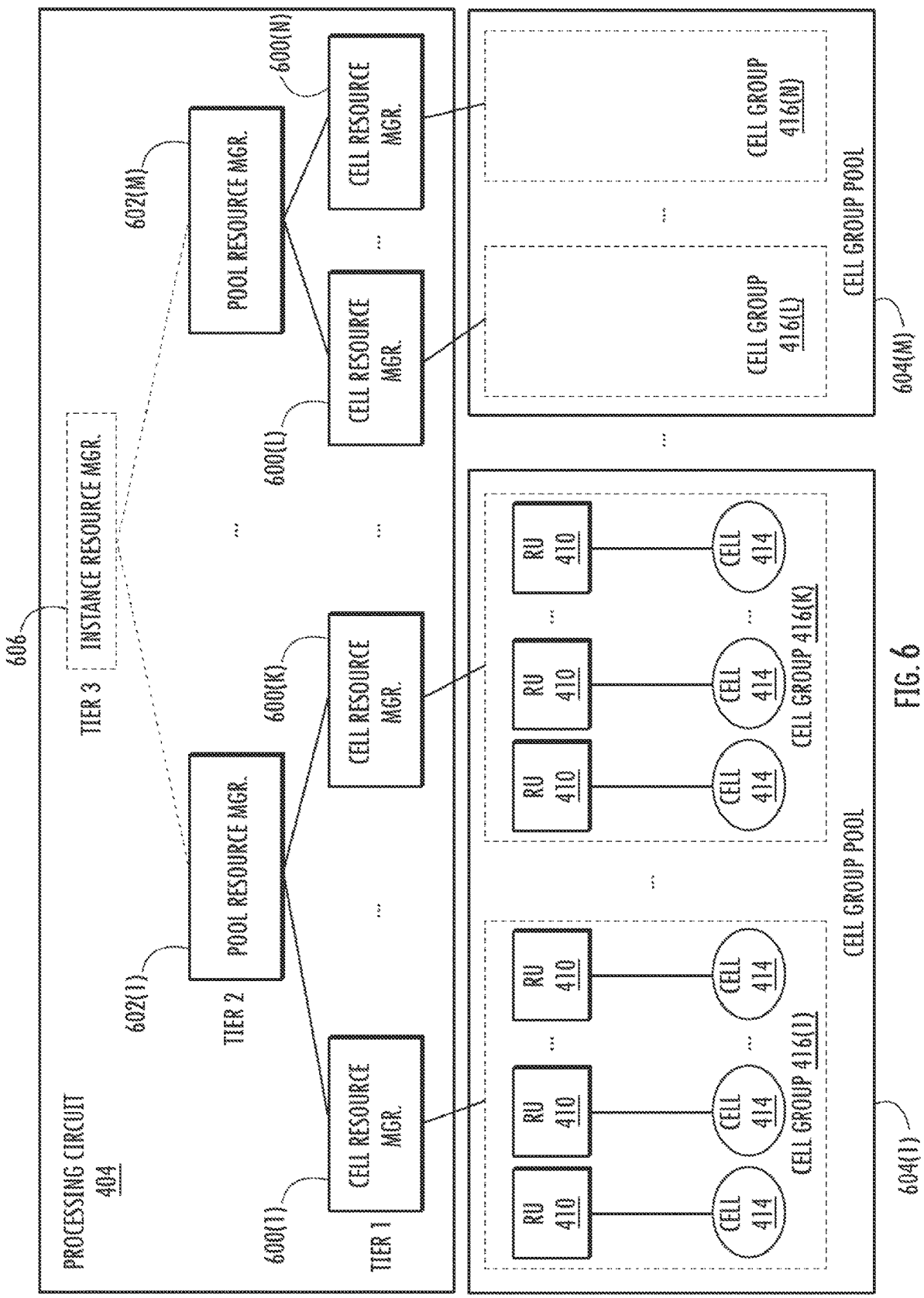
FIG. 6 is a schematic diagram providing an exemplary illustration of a 2-tier and a 3-tier resource management scheme that can be implemented in the network device of FIG. 4 to support dynamic network resource management.

With reference back to FIG. 4, the processing circuit 404 may be configured to dynamically share the set of sharable network functions across the cell groups 416(1)-416(N) based on a 2-tier or a 3-tier resource management scheme. In this regard, FIG. 6 is a schematic diagram providing an exemplary illustration of the 2-tier and the 3-tier resource management scheme that can be implemented in the network device 400 of FIG. 4 to support dynamic network resource management. Common elements between FIGS. 4 and 6 are shown therein with common element numbers and will not be re-described herein.

To support dynamic network resource management based on the 2-tier resource management scheme, the processing circuit 404 can be configured to instantiate a plurality of cell resource managers 600(1)-600(N) (a.k.a. Tier 1). Each of the cell resource managers 600(1)-600(N) corresponds to a respective one of the cell groups 416(1)-416(N) and is configured to manage resource allocation for the respective one of the cell groups 416(1)-416(N). The processing circuit 404 is further configured to instantiate one or more pool resource managers 602(1)-602(M) (a.k.a. Tier 2). Each of the pool resource managers 602(1)-602(M) corresponds to a respective one of one or more cell group pools 604(1)-604 (M). For example, the cell group pool 604(1) can include the cell groups 416(1)-416(K) and the cell group pool 604(M) can include the cell groups 416(L)-416(N) (K<L<N). Accordingly, each of the pool resource managers 602(1)-602(M) can be configured to manage resource allocation for a respective one or more of the cell resource managers 600(1)-600(N). For example, the pool resource manager 602(1) corresponds to the cell group pool 604(1), which includes the cell groups 416(1)-416(K) that are managed by the cell resource managers 600(1)-600(K), respectively. In this regard, the pool resource manager 602(1) is responsible for managing resource allocation for the cell resource managers 600(1)-600(K).

In accordance with the 2-tier resource management scheme, the processing circuit 404 will dynamically share the set of sharable network functions across the pool resource managers 602(1)-602(M). The pool resource managers 602(1)-602(M) are each configured to allocate a respective share of the set of sharable network functions to each of the respective one or more of the cell resource managers 600(1)-600(N). For example, as illustrated in FIG. 6, the pool resource manager 602(1) is configured to allocate the respective share of the set of sharable network functions to the cell resource managers 600(1)-600(K). Each of the cell resource managers 600(1)-600(N), in turn, shares the respective share of the set of sharable network functions in the respective one of the cell groups 416(1)-416(N). For example, the cell resource manager 600(1) would share the respective share of the set of sharable network functions in the cell group 416(1) and the cell resource manager 600(K) would share the respective share of the set of sharable network functions in the cell group 416(K).

In one embodiment, the processing circuit 404 can be configured to dynamically share an equal portion of the set of sharable network functions across the pool resource managers 602(1)-602(M). Accordingly, the pool resource managers 602(1)-602(M) may each allocate a respective portion of the set of sharable network functions allocated by the processing circuit 404 equally across the respective one or more of the cell resource managers 600(1)-600(N). Each of the cell resource managers 600(1)-600(N), in turn, distributes a respective share of the set of sharable network functions allocated by a respective one of the pool resource managers 602(1)-602(M) evenly in the respective one of the cell groups 416(1)-416(N).

In an alternative embodiment, the processing circuit 404 may dynamically share a non-equal portion of the set of sharable network functions across the pool resource managers 602(1)-602(M). The pool resource managers 602(1)-602(M) may each allocate a respective portion of the set of sharable network functions allocated by the processing circuit 404 equally or non-equally across the respective one or more of the cell resource managers 600(1)-600(N). Each of the cell resource managers 600(1)-600(N), in turn, distributes a respective share of the set of sharable network functions allocated by a respective one of the pool resource managers 602(1)-602(M) evenly or non-evenly in the respective one of the cell groups 416(1)-416(N).

To support dynamic network resource management based on the 3-tier resource management scheme, the processing circuit 404 further instantiates an instance resource manager 606 (a.k.a. Tier 3) on top of the pool resource managers 602(1)-602(M) to manage resource allocation across the pool resource managers 602(1)-602(M). In this regard, the instance resource manager 606 may modify the set of sharable network functions allocated across the pool resource managers 602(1)-602(M). For example, the instance resource manager 606 can modify individual allocation to each of the pool resource managers 602(1)-602(M) to ensure that a sum of the allocation across the pool resource managers 602(1)-602(M) does not exceed the set of sharable network functions. For example, the processing circuit 404 may have allocated an equal share of the set of sharable network functions to each of the cell group pools 604(1)-604(M) and the instance resource manager 606 may dynamically increase or decrease the respective share of the sharable network functions in some of the cell group pools 604(1)-604(M) based on actual load conditions. Under certain extreme load conditions, the instance resource manager 606 may even allocate the set of sharable network functions to a single one of the cell group pools 604(1)-604(M).

In an embodiment, the instance resource manager 606 may be configured to modify the set of sharable network functions allocated across the pool resource managers 602(1)-602(M) based on a first periodic interval (e.g., 10 milliseconds). In contrast, the pool resource managers 602(1)-602(M) may be configured to allocate a respective share of the set of sharable network functions to each of the respective one or more of cell resource managers 600(1)-600(N) based on a second periodic interval shorter than the first periodic interval. In a non-limiting example, the second periodic interval can be set to equal a slot duration or a transmission time interval (TTI) (e.g., 1 millisecond).

The instance resource manager 606 may be further configured to dynamically reassociate each of the cell groups 416(1)-416(N) with any of the cell group pools 604(1)-604(M). In other words, the instance resource manager 606 can dynamically reshuffle the respective one or more of the cell groups 416(1)-416(N) in any of the cell group pools 604(1)-604(M). In one embodiment, the instance resource manager 606 may assign one of the cell groups 416(1)-416(N) to one of the cell group pools 604(1)-604(M) such that the set of sharable network functions allocated to the one of the cell group pools 604(1)-604(M) can be maximumly utilized but not overloaded. In another embodiment, the instance resource manager 606 may assign one of the cell groups 416(1)-416(N) to one of the cell group pools 604(1)-604(M) if the one of the cell groups 416(1)-416(N) has such load occurrence correlation properties (e.g., in time domain) that can cause the set of sharable network functions allocated to the one of the cell groups 416(1)-416(N) to be utilized more uniformly (a.k.a. smoothen load usage peaks/valleys).

Figure 7:
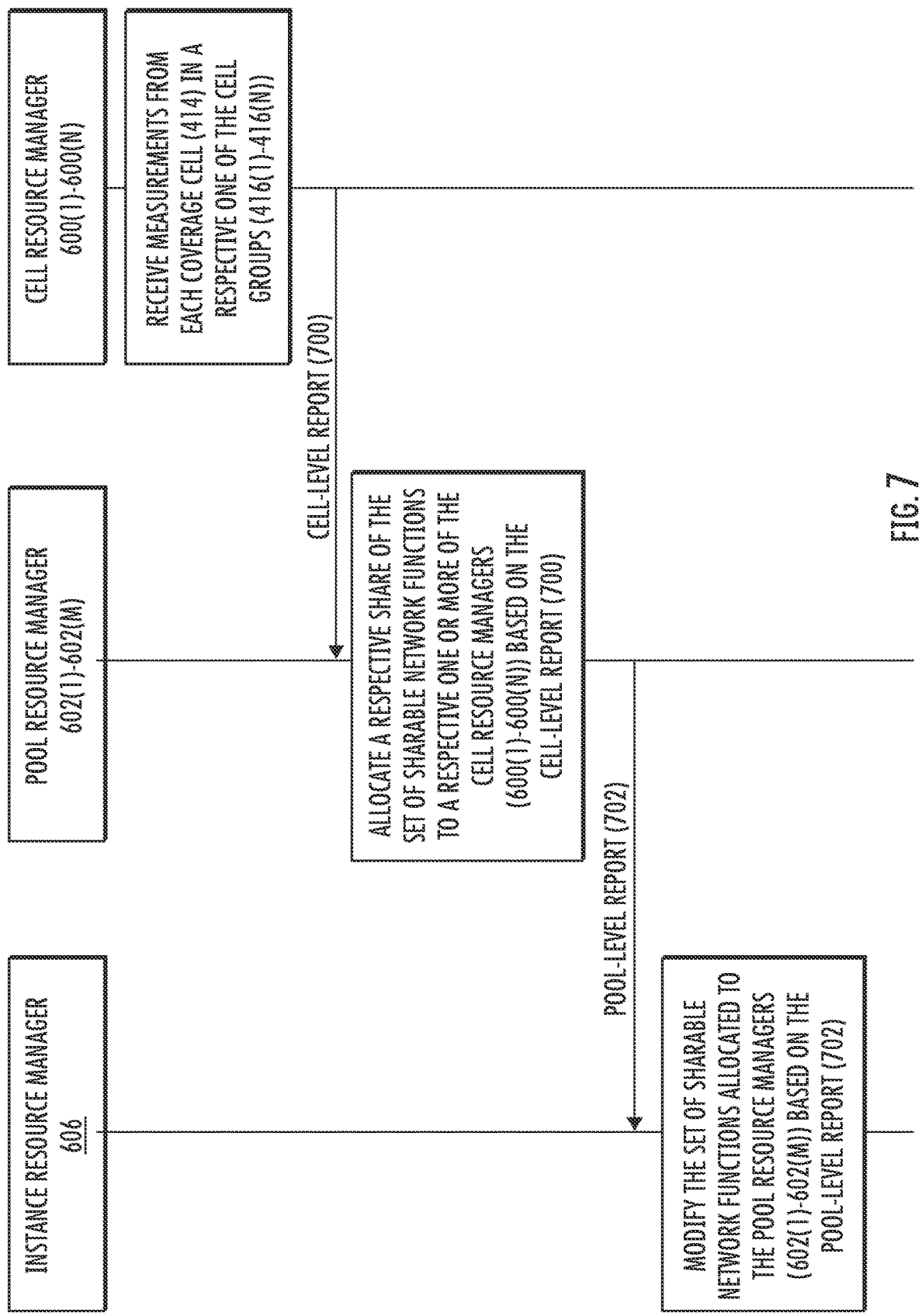
FIG. 7 is a flow diagram providing an exemplary illustration of the network device of FIG. 4 configured to perform dynamic network resource management based on one or more reports.

The network device 400 may be configured to perform dynamic network resource management based on real-time load measurement performance at each of the cell groups 416(1)-416(N) and each of the cell group pools 604(1)-604(M). In this regard, FIG. 7 is a flow diagram providing an exemplary illustration of the network device 400 of FIG. 4 configured to perform dynamic network resource management based on a cell-level report 700 and/or a pool-level report 702. Common elements between FIGS. 4, 6, and 7 are shown therein with common element numbers and will not be re-described herein.

Each of the cell resource managers 600(1)-600(N) may receive load measurements from each coverage cell 414 in a respective one of the cell groups 416(1)-416(N). Accordingly, each of the cell resource managers 600(1)-600(N) generates a cell-level report 700 and provides the cell-level report 700 to a respective one of the pool resource managers 602(1)-602(M). In a non-limiting example, the cell-level report 700 includes such information as number of active users, number of connected users, number guaranteed bit rate (GBR) bearers, best-effort (BE) throughput backlog, average sum proportional fair (SumPF) metric, TTI stretch and cause, and so on. Accordingly, each of the pool resource managers 602(1)-602(M) may allocate a respective share of the set of sharable network functions to a respective one or more of the cell resource managers 600(1)-600(N) based on the cell-level report 700.

In addition, each of the pool resource managers 602(1)-602(M) may generate a pool-level report 702 and provide the pool-level report 702 to the instance resource manager 606. In a non-limiting example, the pool-level report 702 includes such information as number of active users, BE throughput backlog, TTI stretch and cause, and so on. Accordingly, the instance resource manager 606 may modify the set of sharable network functions allocated to any of the pool resource managers 602(1)-602(M) based on the pool-level report 702.

The instance resource manager 606 may be further configured to automatically detect correlation patterns between the cell groups 416(1)-416(N) (e.g., in terms of required load) in time domain. For example, the instance resource manager 606 can use real time information received in the pool-level report 702 to help decide resource allocation for each of the cell group pools 604(1)-604(M). Accordingly, the instance resource manager 606 may use such capacity requirement extrapolated from the pool-level report 702 to reassign any of the cell groups 416(1)-416(N) to any of the cell group pools 604(1)-604(M).

Figure 8:
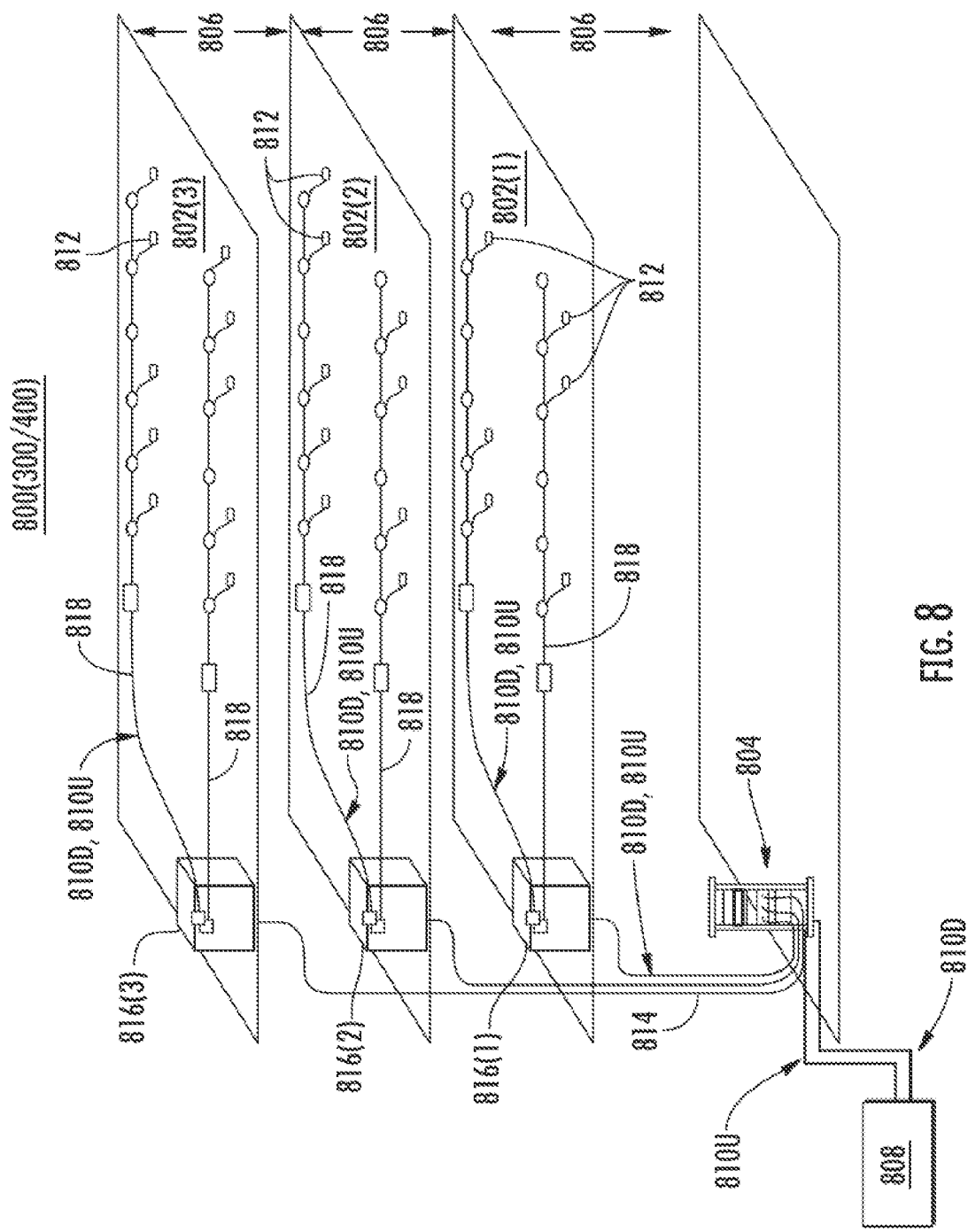
FIG. 8 is a partial schematic cut-away diagram of an exemplary building infrastructure in a WCS, such as the WCS of FIG. 3 that includes the network device of FIG. 4 for supporting dynamic network resource management.

The WCS 300 of FIG. 3, which can include the network device 400 in FIG. 4, can be provided in an indoor environment as illustrated in FIG. 8. FIG. 8 is a partial schematic cut-away diagram of an exemplary building infrastructure 800 in a WCS, such as the WCS 300 of FIG. 3 that includes the network device 400 of FIG. 4. The building infrastructure 800 in this embodiment includes a first (ground) floor 802(1), a second floor 802(2), and a third floor 802(3). The floors 802(1)-802(3) are serviced by a central unit 804 to provide antenna coverage areas 806 in the building infrastructure 800. The central unit 804 is communicatively coupled to a base station 808 to receive downlink communications signals 810D from the base station 808. The central unit 804 is communicatively coupled to a plurality of remote units 812 to distribute the downlink communications signals 810D to the remote units 812 and to receive uplink communications signals 810U from the remote units 812, as previously discussed above. The downlink communications signals 810D and the uplink communications signals 810U communicated between the central unit 804 and the remote units 812 are carried over a riser cable 814. The riser cable 814 may be routed through interconnect units (ICUs) 816(1)-816(3) dedicated to each of the floors 802(1)-802(3) that route the downlink communications signals 810D and the uplink communications signals 810U to the remote units 812 and also provide power to the remote units 812 via array cables 818.

Figure 9:
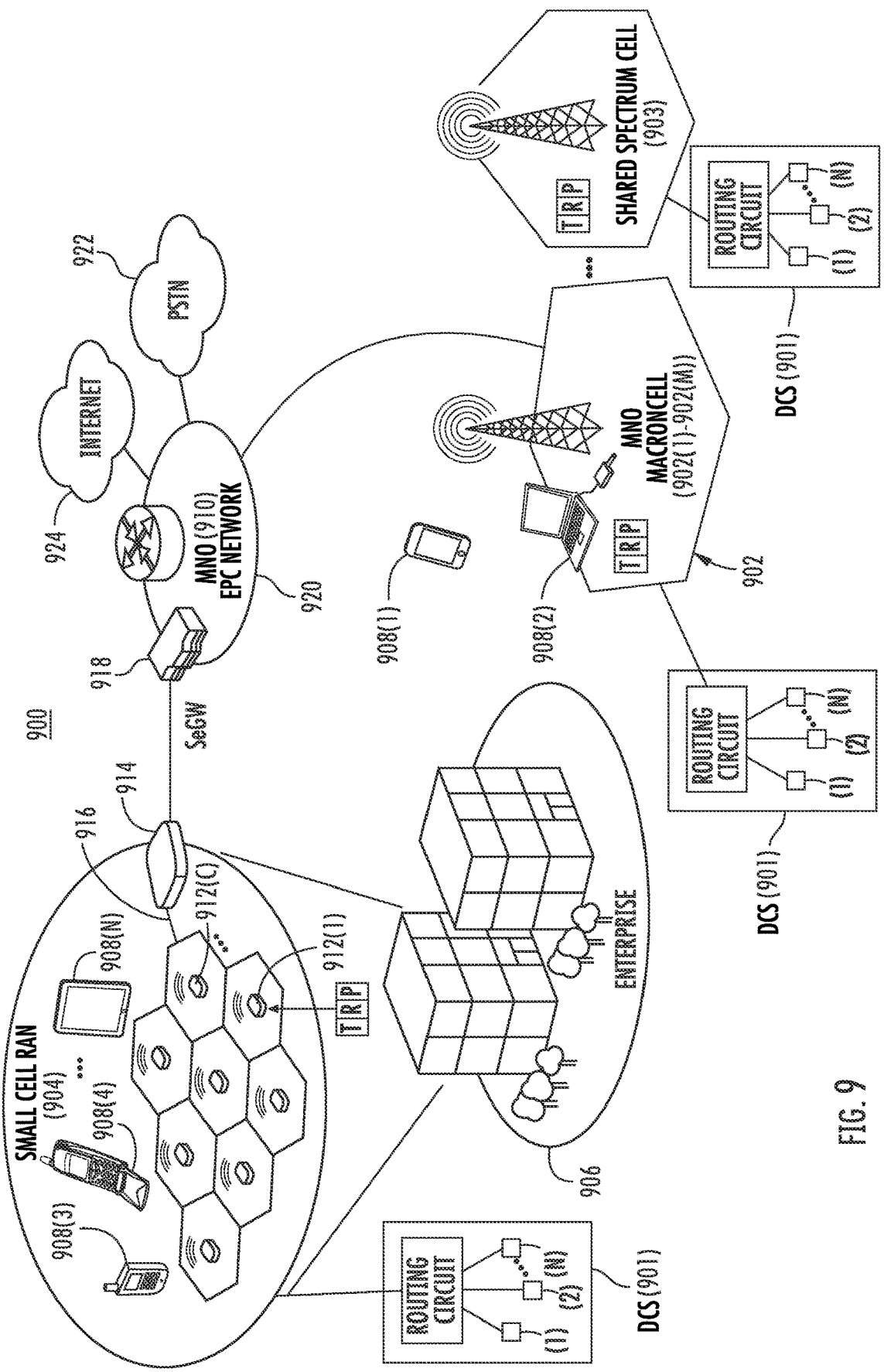
FIG. 9 is a schematic diagram of an exemplary mobile telecommunications environment that can includes the WCS of FIG. 3 that includes the network device of FIG. 4 for supporting dynamic network resource management.

The WCS 300 of FIG. 3 and the network device 400 of FIG. 4 configured to enable dynamic network resource management can also be interfaced with different types of radio nodes of service providers and/or supporting service providers, including macrocell systems, small cell systems, and remote radio heads (RRH) systems, as examples. For example, FIG. 9 is a schematic diagram of an exemplary mobile telecommunications environment 900 (also referred to as "environment 900") that includes radio nodes and cells that may support shared spectrum, such as unlicensed spectrum, and can be interfaced to shared spectrum WCSs 901 supporting coordination of distribution of shared spectrum from multiple service providers to remote units to be distributed to subscriber devices. The shared spectrum WCSs 901 can include the WCS 300 of FIG. 3 that includes the network device 400 of FIG. 4, as an example.

The environment 900 includes exemplary macrocell RANs 902(1)-902(M) ("macrocells 902(1)-902(M)") and an exemplary small cell RAN 904 located within an enterprise environment 906 and configured to service mobile communications between a user mobile communications device 908(1)-908(N) to a mobile network operator (MNO) 910. A serving RAN for the user mobile communications devices 908(1)-908(N) is a RAN or cell in the RAN in which the user mobile communications devices 908(1)-908(N) have an established communications session with the exchange of mobile communications signals for mobile communications. Thus, a serving RAN may also be referred to herein as a serving cell. For example, the user mobile communications devices 908(3)-908(N) in FIG. 9 are being serviced by the small cell RAN 904, whereas the user mobile communications devices 908(1) and 908(2) are being serviced by the macrocell 902. The macrocell 902 is an MNO macrocell in this example. However, a shared spectrum RAN 903 (also referred to as "shared spectrum cell 903") includes a macrocell in this example and supports communications on frequencies that are not solely licensed to a particular MNO, such as CBRS for example, and thus may service user mobile communications devices 908(1)-908(N) independent of a particular MNO. For example, the shared spectrum cell 903 may be operated by a third party that is not an MNO and wherein the shared spectrum cell 903 supports CBRS. Also, as shown in FIG. 9, the MNO macrocell 902, the shared spectrum cell 903, and/or the small cell RAN 904 can interface with a shared spectrum WCS 901 supporting coordination of distribution of shared spectrum from multiple service providers to remote units to be distributed to subscriber devices. The MNO macrocell 902, the shared spectrum cell 903, and the small cell RAN 904 may be neighboring radio access systems to each other, meaning that some or all can be in proximity to each other such that a user mobile communications device 908(3)-908(N) may be able to be in communications range of two or more of the MNO macrocell 902, the shared spectrum cell 903, and the small cell RAN 904 depending on the location of the user mobile communications devices 908(3)-908(N).

In FIG. 9, the mobile telecommunications environment 900 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 900 includes the enterprise environment 906 in which the small cell RAN 904 is implemented. The small cell RAN 904 includes a plurality of small cell radio nodes 912(1)-912(C). Each small cell radio node 912(1)-912(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 9, the small cell RAN 904 includes one or more services nodes (represented as a single services node 914) that manage and control the small cell radio nodes 912(1)-912(C). In alternative implementations, the management and control functionality may be incorporated into a radio node, distributed among nodes, or implemented remotely (i.e., using infrastructure external to the small cell RAN 904). The small cell radio nodes 912(1)-912(C) are coupled to the services node 914 over a direct or local area network (LAN) connection 916 as an example, typically using secure IPsec tunnels. The small cell radio nodes 912(1)-912(C) can include multi-operator radio nodes. The services node 914 aggregates voice and data traffic from the small cell radio nodes 912(1)-912(C) and provides connectivity over an IPsec tunnel to a security gateway (SeGW) 918 in a network 920 (e.g, evolved packet core (EPC) network in a 4G network, or 5G Core in a 5G network) of the MNO 910. The network 920 is typically configured to communicate with a public switched telephone network (PSTN) 922 to carry circuit-switched traffic, as well as for communicating with an external packet-switched network such as the Internet 924.

The environment 900 also generally includes a node (e.g., eNodeB or gNodeB) base station, or "macrocell" 902. The radio coverage area of the macrocell 902 is typically much larger than that of a small cell where the extent of coverage often depends on the base station configuration and surrounding geography. Thus, a given user mobile communications device 908(3)-908(N) may achieve connectivity to the network 920 (e.g., EPC network in a 4G network, or 5G Core in a 5G network) through either a macrocell 902 or small cell radio node 912(1)-912(C) in the small cell RAN 904 in the environment 900.

Figure 10:
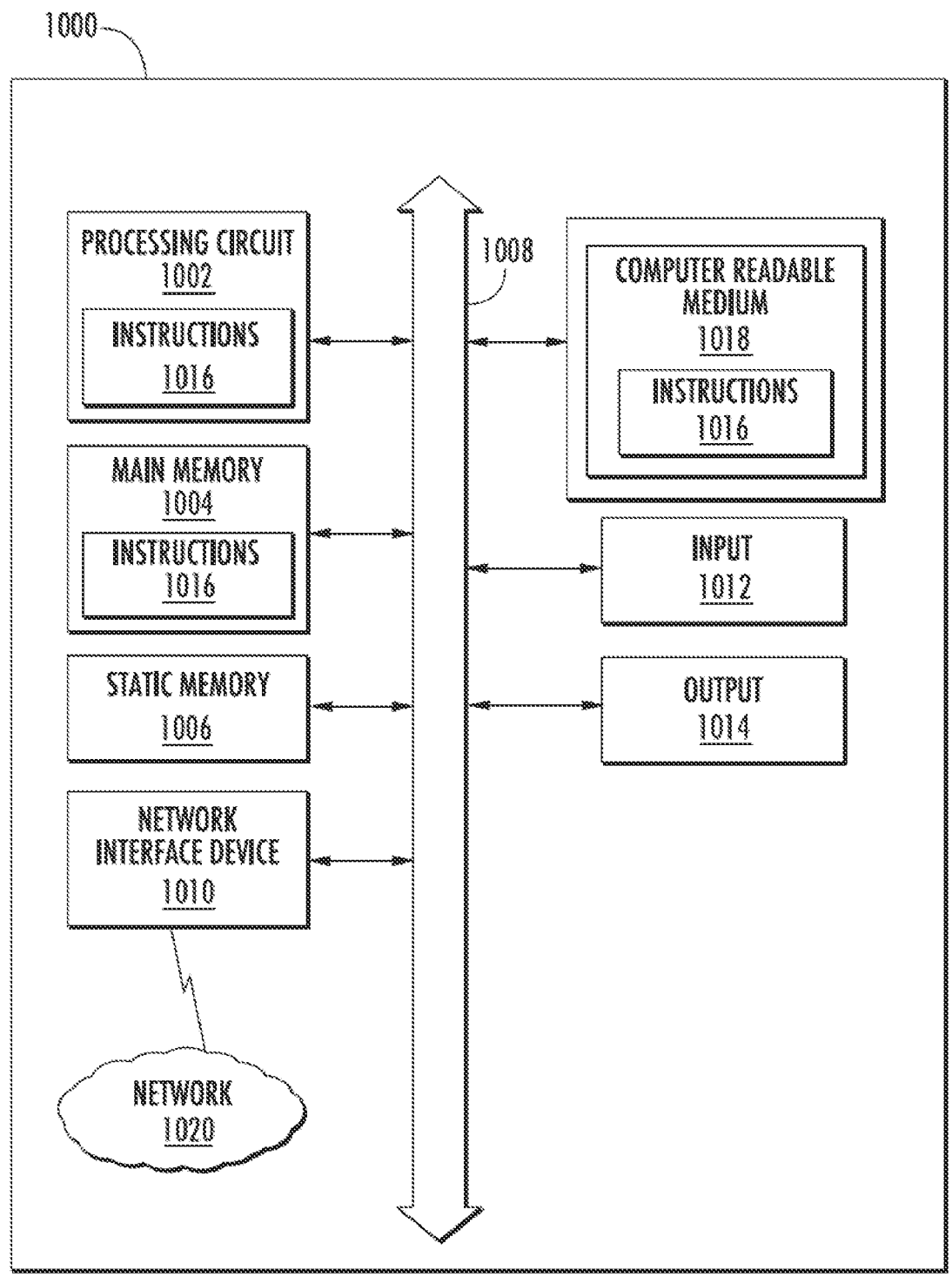
FIG. 10 is a schematic diagram of a representation of an exemplary computer system that can be included in or interfaced with any of the components in the WCS of FIG. 3 and the network device in FIG. 4 for support dynamic network resource management, wherein the exemplary computer system is configured to execute instructions from an exemplary computer-readable medium.

Any of the circuits in the WCS 300 of FIG. 3 and the network device 400 of FIG. 4, such as the processing circuit 404, can include a computer system 1000, such as that shown in FIG. 10, to carry out their functions and operations. With reference to FIG. 10, the computer system 1000 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1000 in this embodiment includes a processing circuit or processor 1002, a main memory 1004 (e.g., read-only memory (ROM), flash memory, dynamic random access memory (DRAM) such as synchronous DRAM (SDRAM), etc.), and a static memory 1006 (e.g., flash memory, static random access memory (SRAM), etc.), which may communicate with each other via a data bus 1008. Alternatively, the processing circuit 1002 may be connected to the main memory 1004 and/or static memory 1006 directly or via some other connectivity means. The processing circuit 1002 may be a controller, and the main memory 1004 or static memory 1006 may be any type of memory.

The processing circuit 1002 represents one or more general-purpose processing circuits such as a microprocessor, central processing unit, or the like. More particularly, the processing circuit 1002 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1002 is configured to execute processing logic in instructions 1016 for performing the operations and steps discussed herein.

The computer system 1000 may further include a network interface device 1010. The computer system 1000 also may or may not include an input 1012 to receive input and selections to be communicated to the computer system 1000 when executing instructions. The computer system 1000 also may or may not include an output 1014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processing circuit 1002 during execution thereof by the computer system 1000, the main memory 1004 and the processing circuit 1002 also constituting the computer-readable medium 1018. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A wireless communications system (WCS), comprising:
   a plurality of radio access network (RAN) remote units each configured to communicate a downlink communications signal and an uplink communications signal via a respective one of a plurality of cell groups; and
   a network device coupled to the plurality of RAN remote units, the network device comprising a distribution unit (DU), wherein the DU comprises:
      an interface circuit coupled to a centralized services node and the plurality of RAN remote units; and
      a processing circuit configured to:
         determine the set of sharable network functions among the set of configured network functions; and
         cause the network device to dynamically share the set of sharable network functions across at least the subset of the plurality of cell groups;
   wherein the network device is configured to:
      determine a set of sharable network functions among a set of configured network functions; and
      dynamically share the set of sharable network functions across at least a subset of the plurality of cell groups; and
   wherein the processing circuit is further configured to:
      instantiate a plurality of cell resource managers each configured to manage a respective one of the plurality of cell groups;
      instantiate one or more pool resource managers each corresponding to a respective one of one or more cell group pools and configured to manage a respective one or more of the plurality of cell resource managers; and
      dynamically share the set of sharable network functions across the one or more pool resource managers; and
   wherein the one or more pool resource managers is each configured to allocate a respective share of the set of sharable network functions to each of the respective one or more of the plurality of cell resource managers; and the plurality of cell resource managers is each configured to share the respective share of the set of sharable network functions in the respective one of the plurality of cell groups.

2. The WCS of claim 1, wherein the network device is further configured to:
   determine a set of non-sharable network functions among the set of configured network functions; and
   not share the set of non-sharable network functions with any of the plurality of cell groups.

3. The WCS of claim 2, wherein:
   the set of configured network functions comprises a plurality of physical resource blocks (PRBs);
   the set of sharable network functions comprises a subset of the plurality of PRBs configured to be allocated at least to a physical downlink shared channel (PDSCH) and a physical uplink shared channel (PUSCH); and
   the set of non-sharable network functions comprises another subset of the plurality of PRBs configured to be allocated at least to a physical downlink control channel (PDCCH) and a physical uplink control channel (PUCCH).

4. The WCS of claim 1, wherein:
   the processing circuit is further configured to dynamically share an equal portion of the set of sharable network functions across the one or more pool resource managers;

the one or more pool resource managers is each further configured to allocate a respective portion of the set of sharable network functions allocated by the processing circuit equally across the respective one or more of the plurality of cell resource managers; and the plurality of cell resource managers is each further configured to distribute a respective share of the set of sharable network functions allocated by a respective one of the one or more pool resource managers evenly in the respective one of the plurality of cell groups.

5. The WCS of claim 1, wherein:
the processing circuit is further configured to instantiate an instance resource manager configured to manage the one or more pool resource managers; and
the instance resource manager is configured to dynamically modify the set of sharable network functions allocated across the one or more pool resource managers.

6. The WCS of claim 5, wherein:
the instance resource manager is further configured to modify the set of sharable network functions allocated across the one or more pool resource managers based on a first periodic interval; and
the one or more pool resource managers is each configured to allocate the respective share of the set of sharable network functions to each of the respective one or more of the plurality of cell resource managers based on a second periodic interval shorter than the first periodic interval.

7. The WCS of claim 5, wherein the instance resource manager is further configured to dynamically reassociate each of the plurality of cell groups with any of the one or more cell group pools.

8. The WCS of claim 5, wherein:
each of the plurality of cell resource managers is further configured to provide, to the respective one of the one or more pool resource managers, a cell-level report;
each of the one or more pool resource managers is further configured to provide, to the instance resource manager, a pool-level report;
the one or more pool resource managers is each configured to allocate the respective share of the set of sharable network functions to each of the respective one or more of the plurality of cell resource managers based on the cell-level report; and
the instance resource manager is configured to modify the set of sharable network functions allocated to any of the one or more pool resource managers based on the pool-level report.

9. The WCS of claim 1, further comprising a distributed communications system (DCS), the DCS comprising:
a digital routing unit (DRU) coupled to a centralized services node via a baseband unit (BBU); and
a plurality of remote units each coupled to the DRU via a plurality of optical fiber-based communications mediums, respectively;
wherein:
the DRU is configured to:
receive the downlink communications signal from the centralized services node;
convert the downlink communications signal into a plurality of downlink communications signals;
distribute the plurality of downlink communications signals to the plurality of remote units, respectively;
receive a plurality of uplink communications signals from the plurality of remote units, respectively;
convert the plurality of uplink communications signals into the uplink communications signal; and
provide the uplink communications signal to the centralized services node.

10. The WCS of claim 9, wherein:
the DRU comprises:
an electrical-to-optical (E/O) converter configured to convert the plurality of downlink communications signals into a plurality of downlink optical communications signals, respectively; and
an optical-to-electrical (O/E) converter configured to convert a plurality of uplink optical communications signals into the plurality of uplink communications signals, respectively; and
the plurality of remote units each comprises:
a respective O/E converter configured to convert a respective one of the plurality of downlink optical communications signals into a respective one of the plurality of downlink communications signals; and
a respective E/O converter configured to convert a respective one of the plurality of uplink communications signals into a respective one of the plurality of uplink optical communications signals.

11. A method for supporting dynamic network resource management in a wireless communications system (WCS), comprising:
determining a set of sharable network functions among a set of configured network functions;
dynamically sharing the set of sharable network functions across at least a subset of a plurality of cell groups each comprising one or more of a plurality of coverage cells;
instantiating a plurality of cell resource managers each configured to manage a respective one of the plurality of cell groups;
instantiating one or more pool resource managers each corresponding to a respective one of one or more cell group pools and configured to manage a respective one or more of the plurality of cell resource managers;
dynamically sharing the set of sharable network functions across the one or more pool resource managers;
allocating a respective share of the set of sharable network functions to each of the respective one or more of the plurality of cell resource managers; and
sharing the respective share of the set of sharable network functions in the respective one of the plurality of cell groups.

12. The method of claim 11, further comprising:
determining a set of non-sharable network functions among the set of configured network functions; and
not sharing the set of non-sharable network functions with any of the plurality of cell groups.

13. The method of claim 11, further comprising:
dynamically sharing an equal portion of the set of sharable network functions across the one or more pool resource managers;
allocating an equal share of the set of sharable network functions to each of the respective one or more of the plurality of cell resource managers; and
distributing the respective share of the set of sharable network functions evenly in the respective one of the plurality of cell groups.

14. The method of claim 11, further comprising:
instantiating an instance resource manager configured to manage the one or more pool resource managers; and
modifying the set of sharable network functions allocated across the one or more pool resource managers.

15. The method of claim 14, further comprising:
- modifying the set of sharable network functions allocated across the one or more pool resource managers based on a first periodic interval; and
- allocating the respective share of the set of sharable network functions to each of the respective one or more of the plurality of cell resource managers based on a second periodic interval shorter than the first periodic interval.

16. The method of claim 15, further comprising dynamically reassociating each of the plurality of cell groups with any of the one or more cell group pools.

17. The method of claim 14, further comprising:
- providing, to the respective one of the one or more pool resource managers, a cell-level report;
- providing, to the instance resource manager, a pool-level report;
- allocating the respective share of the set of sharable network functions to each of the respective one or more of the plurality of cell resource managers based on the cell-level report; and
- modifying the set of sharable network functions allocated to any of the one or more pool resource managers based on the pool-level report.

* * * * *